April 29, 1952 W. L. KAUFFMAN, II 2,595,147
AUTOMATIC INDEX DEVICE FOR WRINGERS
Filed May 22, 1946 7 Sheets-Sheet 1

INVENTOR.
BY Walter L. Kauffman II
Ralph Hammar
Attorney

April 29, 1952 W. L. KAUFFMAN, II 2,595,147
AUTOMATIC INDEX DEVICE FOR WRINGERS
Filed May 22, 1946 7 Sheets-Sheet 2

INVENTOR.
BY Walter L Kauffman II
Ralph Hammer
attorney

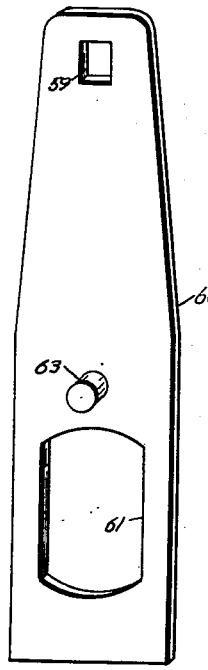
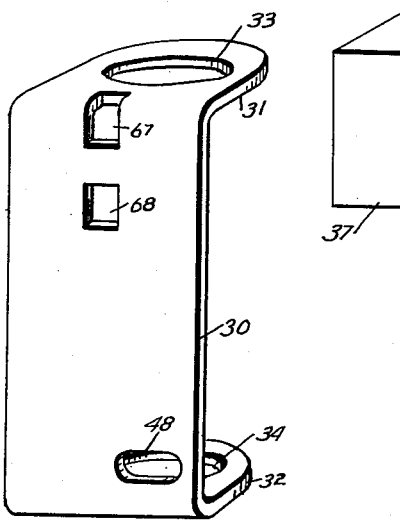
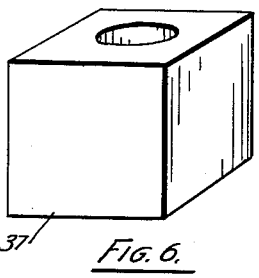
Fig. 4. Fig. 5. Fig. 6.
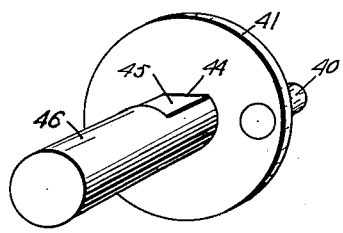
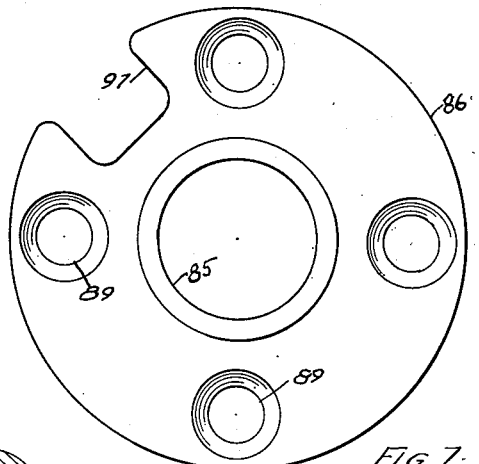
Fig. 8. Fig. 7.
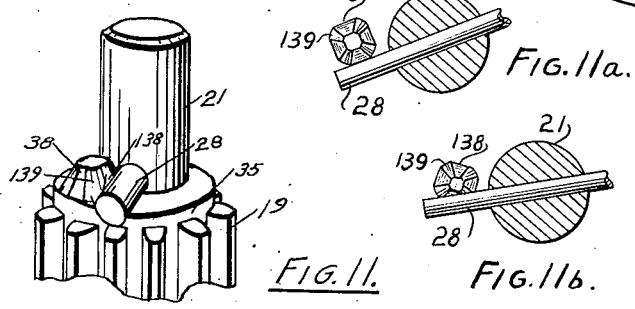
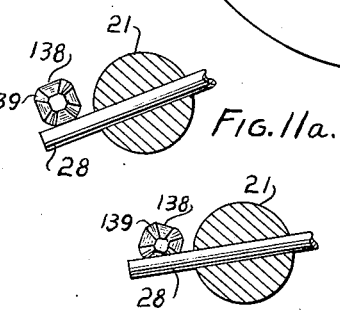
Fig. 11. Fig. 11b. Fig. 11a.
INVENTOR.
BY Walter L Kauffman II
Ralph Hammer
attorney

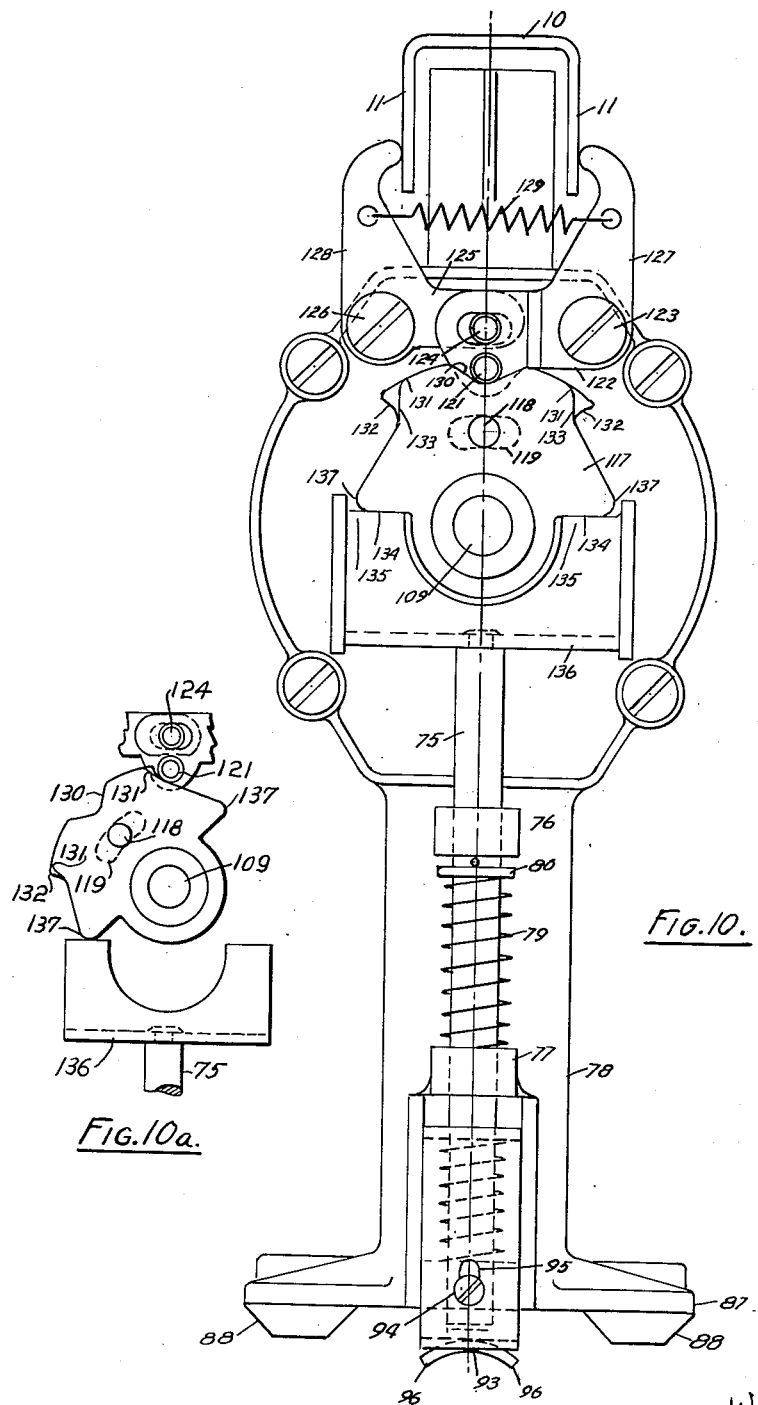

April 29, 1952 W. L. KAUFFMAN, II 2,595,147
AUTOMATIC INDEX DEVICE FOR WRINGERS
Filed May 22, 1946 7 Sheets-Sheet 5
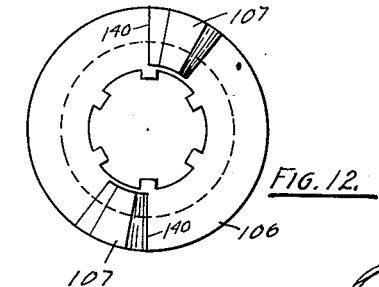
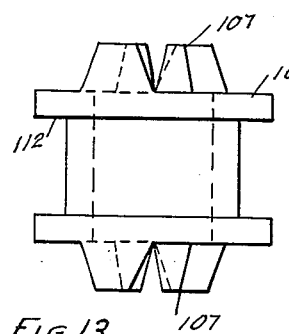
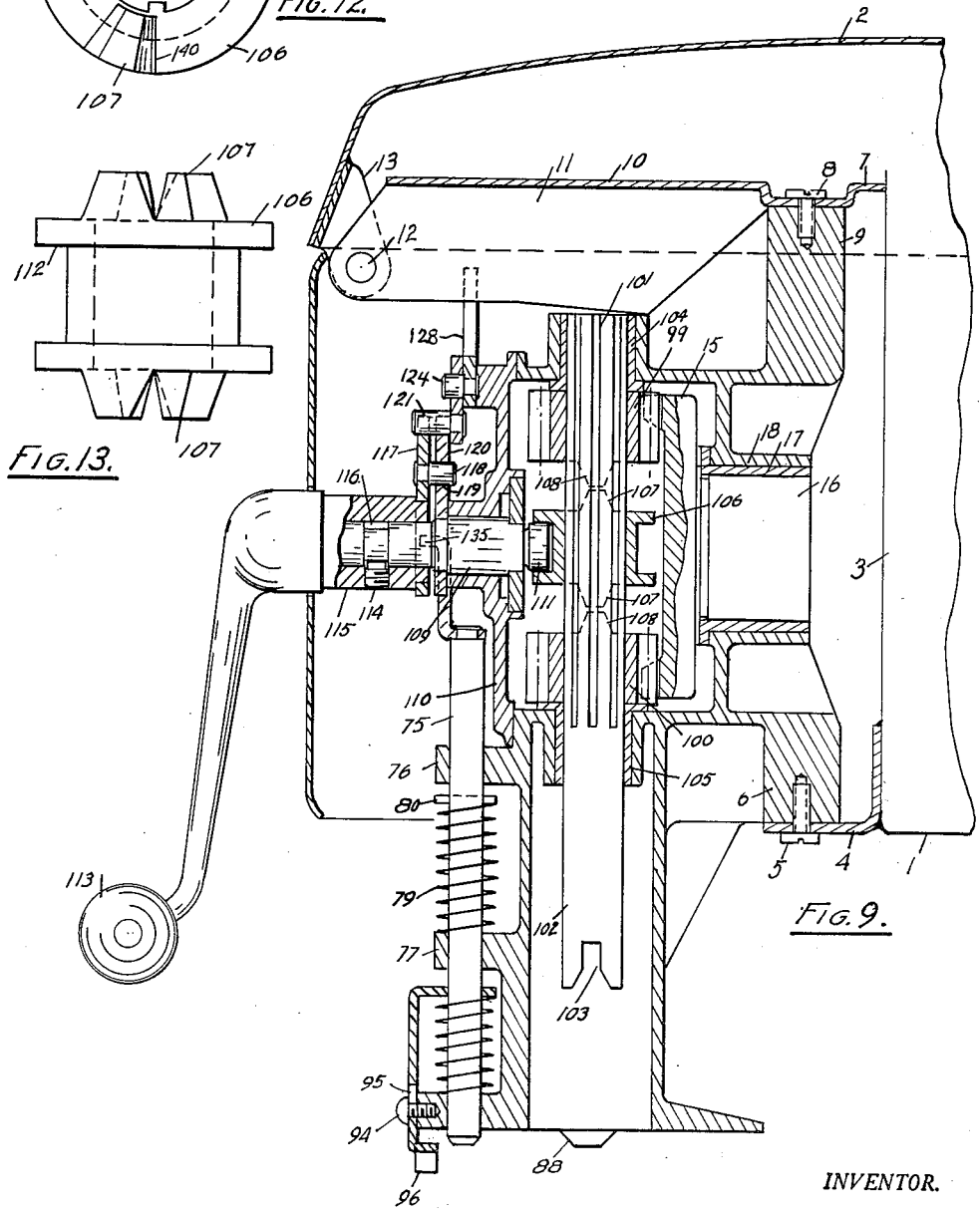
INVENTOR.
BY Walter L. Kauffman II
Ralph Hammar
Attorney

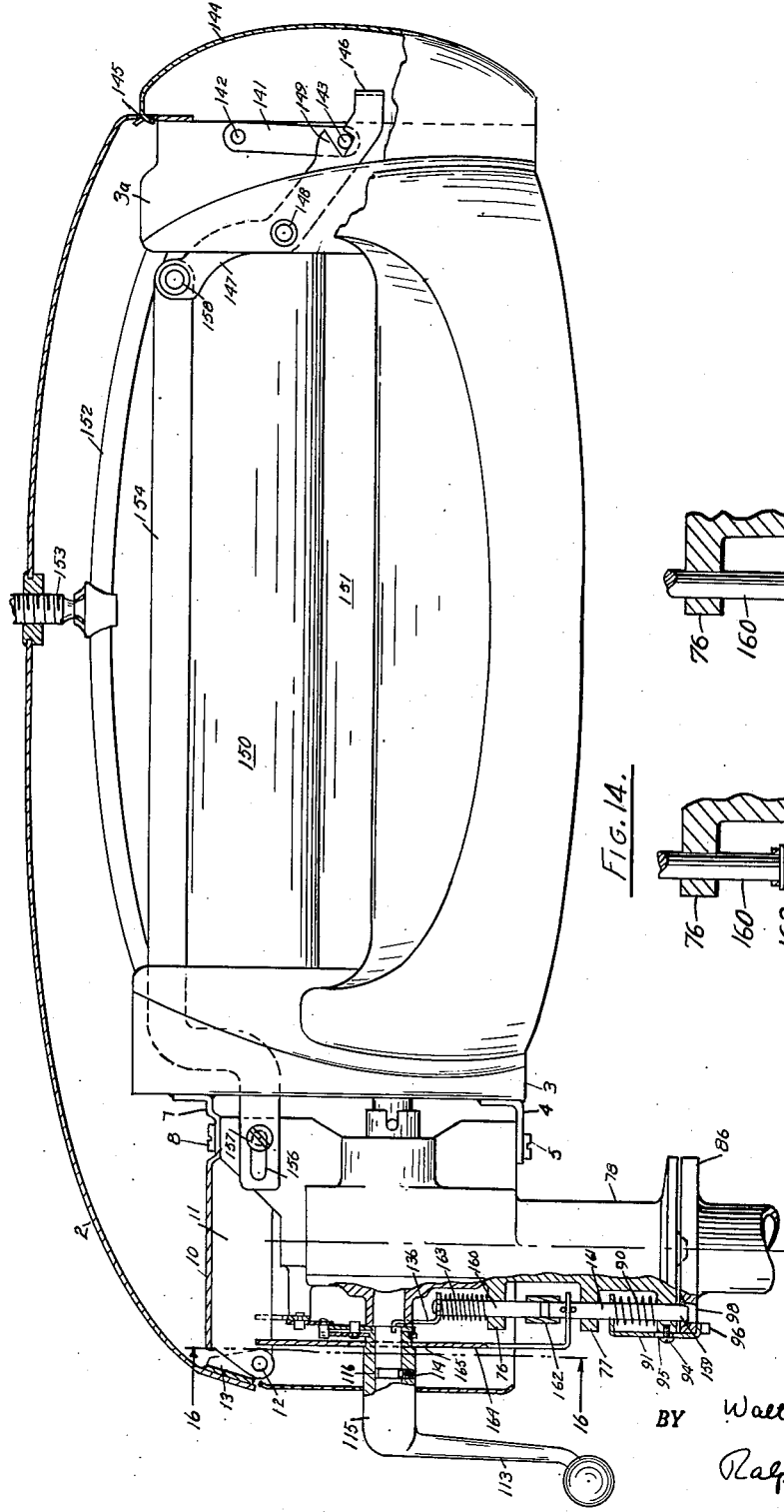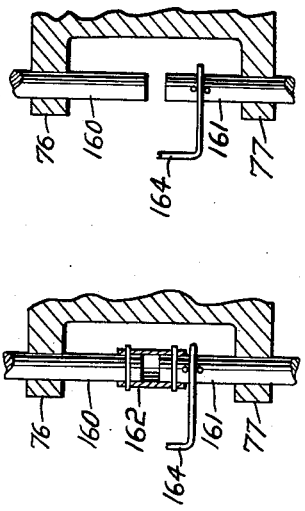

April 29, 1952  W. L. KAUFFMAN, II  2,595,147
AUTOMATIC INDEX DEVICE FOR WRINGERS
Filed May 22, 1946  7 Sheets-Sheet 7
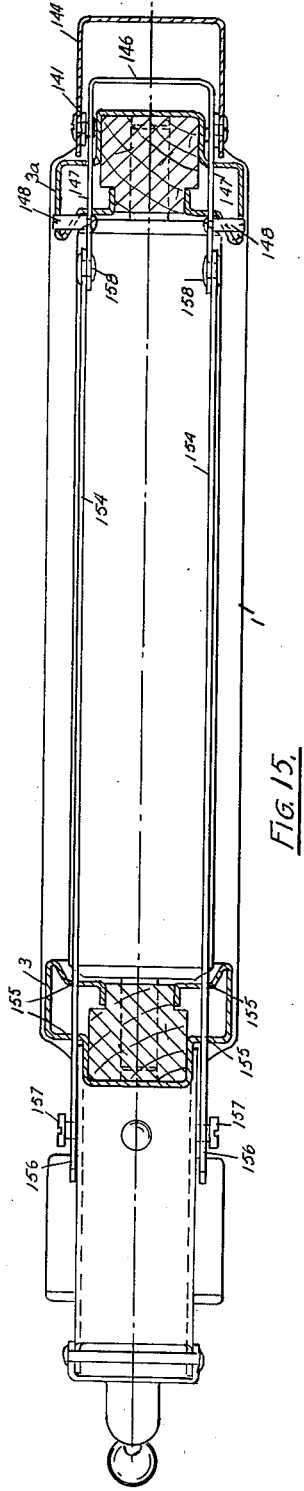
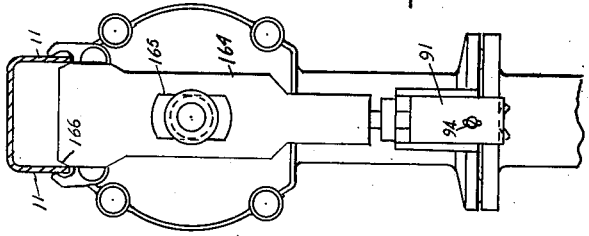
INVENTOR.
BY Walter L Kauffman II
Ralph Hammar
Attorney Patented Apr. 29, 1952

2,595,147

UNITED STATES PATENT OFFICE 2,595,147

AUTOMATIC INDEX DEVICE FOR WRINGERS

Walter L. Kauffman, II, Erie, Pa., assignor to Lovell Manufacturing Company, a corporation of Pennsylvania Application May 22, 1946, Serial No. 671,593

20 Claims. (Cl. 68—255)

1

This invention is intended to facilitate the operation of swinging wringers for domestic clothes washing machines by providing an automatic index device for locating the wringer in the desired angular position with respect to the wringer post. This permits the use of a more sensitive safety release particularly when an interlock is provided between the index and the wringer drive or pressure release. It has particular advantages in wringers of the instinctive release type. Further objects and advantages appear in the specification and claims.

Figure 1:
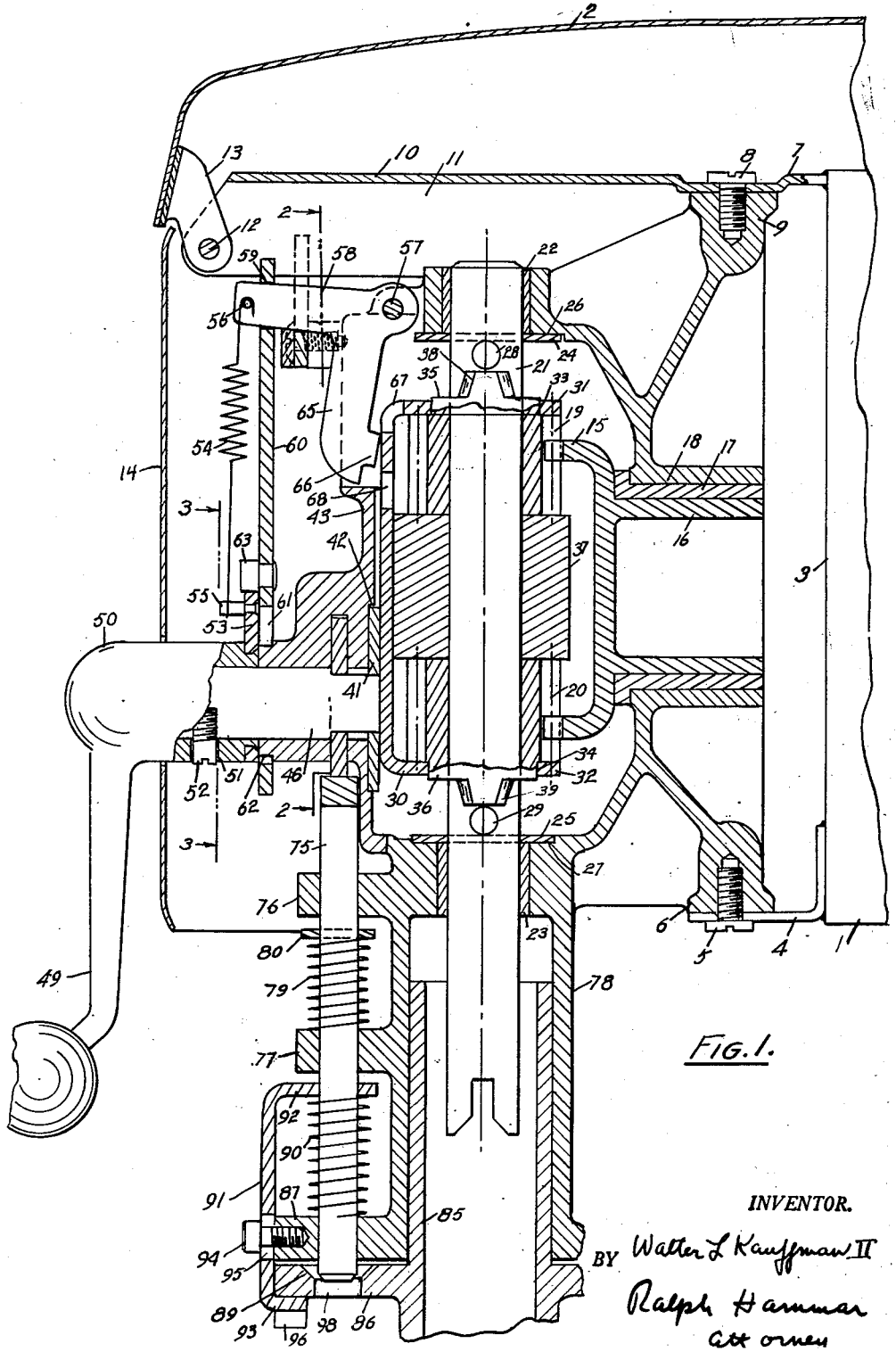
Figure 2:
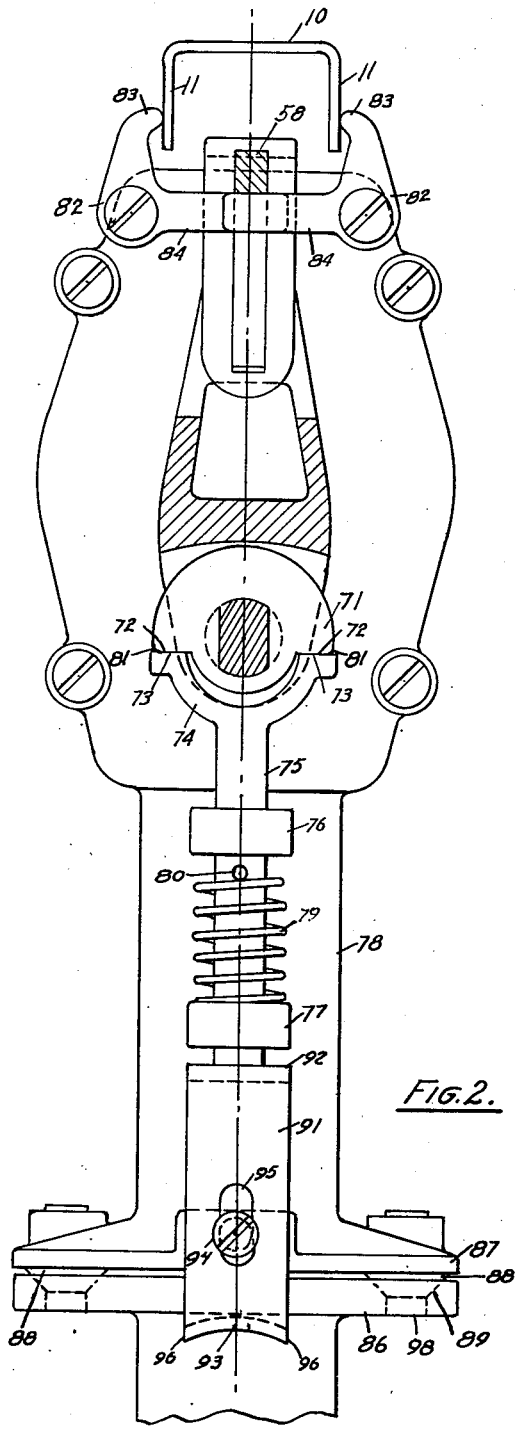
Figure 3:
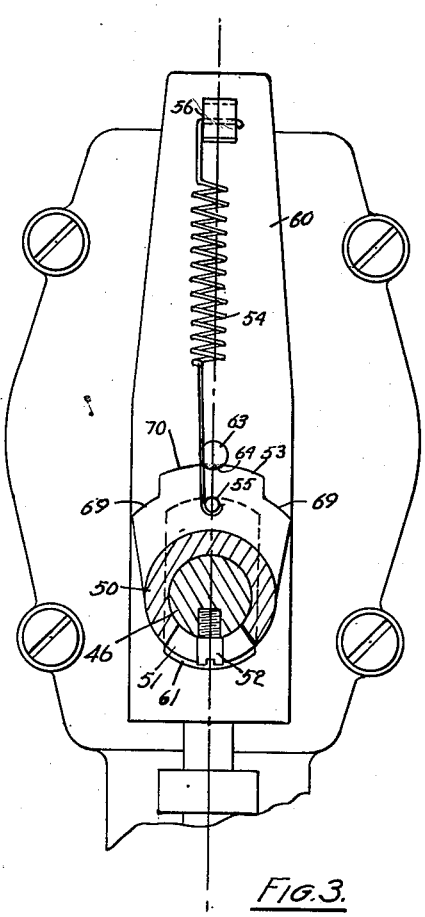

In the drawings, Fig. 1 is a sectional elevation through a wringer head; Figs. 2 and 3 are end elevations of the wringer head in section along lines 2—2 and 3—3 of Fig. 1; Fig. 4 is a perspective of the latch releasing the wringer drive; Fig. 5 is a perspective of the wringer gear drive carrier; Fig. 6 is a perspective of the thrust block between the wringer drive gears; Fig. 7 is a top view of the wringer post thrust collar; Fig. 8 is a perspective of the crank for shifting the gear carrier; Fig. 9 is a sectional elevation of a modified wringer head; Fig. 10 is an end elevation of the modification; Fig. 10a is a fragmentary end elevation similar to Fig. 10, but with the parts in the driving position; Fig. 11 is a perspective of the clutch surface for the wringer head of Fig. 1; Figs. 11a and 11b are enlarged views of the Fig. 11 clutch surface; Figs. 12 and 13 are end and side elevations of clutch teeth for the Fig. 9 wringer head; Fig. 14 is a side elevation of another modification; Fig. 14a is a fragmentary view of the Fig. 14 wringer showing the index lock and the latch release connected; Fig. 14b is a similar view with the connection omitted; Fig. 15 is a top plan view of the Fig. 14 wringer with the top bar removed; and Fig. 16 is an end view of the wringer head in section on line 16—16 of Fig. 14.

Referring to the drawings, 1 and 2 indicate the bottom and top frames of a clothes wringer. Only the portions of the frames connected to the wringer head are shown since the remaining parts may be of conventional construction. The bottom frame has a side stile 3 having at the lower end a bracket 4 pivoted at 5 on a boss 6 on the wringer head. At the top of the side stile is a bracket 7 pivoted at 8 on a boss 9 at the top of the wringer head. The bracket 7 has a channel shaped extension 10 having depending sides 11 across which extends a hinge pin 12 for hinge members 13 fixed to the top bar. As shown more in detail in my application Ser. No. 612,969, filed August 27, 1945, the bracket 7 may be integral with the bottom frame and the bottom frame may also include an integral skirt 14 depending around the wringer head. The pivotal mounting of the bottom frame on the wringer head provides for movement of the wringer relative to the head in response to a thrust on the wringer rolls, which movement, as hereinafter described, is used to actuate a safety release.

The wringer is driven by a crown gear 15 having a hub 16 journalled in a sleeve and thrust bearing 17 fixed in a boss 18 on the wringer head. The crown gear continuously meshes with upper and lower pinions 19 and 20 loose on a shaft 21 journalled in upper and lower bearings 22 and 23. Axial movement of the shaft 21 is prevented by thrust washers 24 and 25 bearing on thrust surfaces 26 and 27. The axial thrusts on the shaft are transmitted to the thrust washers by pins 28 and 29, the outer ends of which project on both sides of the shaft. The pinions 19 and 20 are shown in the neutral position. The driving connection to one or the other of the pinions is made by sliding up or down a carrier 30. The carrier has upper and lower flanges 31 and 32 having openings 33 and 34 receiving hubs 35 and 36 on the pinions 19 and 20. Between the pinions is a spacing block 37. On the hubs 35 and 36 of the pinions are tapered clutch teeth 38 and 39 which cooperate with the projecting ends of the pins 28 and 29 to establish the driving connection between the shaft 21 and the pinions. The tapered surfaces of the clutch teeth 38 and 39 result in an axial thrust tending to move the pinions from the driving to the neutral position. This axial thrust is proportional to the driving torque and therefore compensates for any increase in the shifting force due to load on the driving mechanism. Without such compensation the gears would be harder to shift under load than under no load. The construction is such that the driving thrusts have substantially no tendency to bend the flanges 31 or 32 of the carrier.

When the carrier is in the upper position, in which the clutch teeth 38 engage the pin 28, the axial thrusts between the pin and clutch teeth are transmitted from the pin 28 to the thrust washers 24 and from the clutch teeth 38 through the pinion 19 to the thrust block 37 and from the thrust block through the pinion 20 to the lower flange 32. Because of the flat thrust surfaces between the pinions and the thrust block and the extended guiding surface between the thrust block and the shaft 21, the thrust has substantially no tendency to bend the flange 32. The sole guide for the axial movement of the carrier 30 is provided by the sliding fits between the shaft 21 and the pinions 19 and 20 and the spacing block 37.

The carrier is shifted by a crank pin 40 (Fig. 8) fixed in a disk 41 guided in a circular recess 42 in a removable end plate 43 for the wringer head. The disk 41 has a non-circular opening 44 slideably receiving the corresponding portion 45 of a shaft 46. The front face 47 of the disk 41 engages the outer face of the carrier 30 and prevents turning of the carrier on the shaft 21. The crank pin 40 projects through a slot 48 at the lower end of the carrier and moves the carrier up and down as the shaft 46 is turned. The length of the slot 48 is such that the crank pin 40 is adjacent one end of the slot in each driving position. The shaft 46 is turned by a handle 49 having a hub 50 loosely fitting over the outer end of the shaft 46. The hub has a slot 51 receiving the head 52 of a set screw in the shaft 46. This provides a lost motion connection between the handle 49 and the shaft 46 so that the shaft is not turned until after the handle has taken up the lost motion between the set screw 52 and the slot 51. In addition to providing a lost motion connection, the set screw also prevents sliding the handle off the end of the shaft.

Non-rotatably fixed on the inner end of the hub 50 is a latch plate 53 yieldably centered in the position shown in Fig. 3 by a centering spring 54 connected between a pin 55 on the latch plate and a pin 56 on a bell crank lever pivoted at 57 on the upper part of the wringer head. One arm 58 of the bell crank lever projects through a slot 59 in a latch member 60, the lower end of which has a substantially rectangular opening 61 guided on a boss 62 on the end plate 43. The tension of the spring 54 acts through the arm 58 and the slot 59 to urge the latch member 60 downward and to hold a latch pin 63 on the member 60 against the upper edge of the latch plate 53. The latch plate has at its neutral position a shallow detent recess 64 receiving the pin 63. The other arm 65 of the bell crank lever has at its inner surface a latching projection 66 receivable in openings 67 or 68 on the gear carrier 30 to latch the gear carrier in the respective driving positions.

In the neutral position shown in Fig. 1, the projection 66 is held short of the carrier so as not to interfere with the movement of the carrier. In the driving positions the pin 63 on the latch member 60 rests on one of the shoulders 69 on the latch plate 53 permitting a lowering of the latch member 60 and a corresponding pivotal movement of the bell crank lever moving the projection 66 into one of the openings 67 or 68. Due to the lost motion connection between the handle 49 and the shaft 46, the initial movement of the handle from either driving position toward neutral first releases the latch by turning the latch plate 53 to a position in which the pin 63 rests on the elevated central section 70 of the latch plate. If the wringer rolls are being driven at this time, the axial thrust between the clutch teeth 38 or 39 and the pins 28 or 29 moves the gear carrier toward the neutral position. This simplifies the shifting of gears since the shift is automatically accomplished by the wringer drive torque once the latch is released.

To take care of the condition when the gears are shifted from the driving to neutral position when the wringer is not being driven, the gear carrier is yieldably returned to the neutral position through the action of an interlock cam 71 (Fig. 2) keyed on the shaft 46. The cam is shown in Fig. 2 in the neutral position in which horizontal surfaces 72 engage corresponding surfaces 73 at the outer ends of a fork 74 fixed to the upper end of an index pin 75. The index pin is slidably guided in ears 76 and 77 projecting from a depending tubular sleeve 78 at the lower end of the wringer head. A compression spring 79 arranged between the ear 77 and a pin 80 through the index pin urges the index pin upward and yieldingly resists turning of the interlock cam 71 from the neutral position. In the driving position the cam is turned to the right or left from the position shown in Fig. 2, bringing one or the other of the rounded ends 81 of the interlock cam 71 against the cooperating surface 73 and pushing the index pin downward. This compresses the spring 79 and stores a force which tends to return the shaft 46 to the neutral position. When the latching projection 66 is moved out of one of the openings 67 or 68 in the gear carrier 30, the force stored in the spring 79 acts through the interlock cam 71 to turn the shaft 46 to the neutral position. The return of the gears from the driving position is therefore both spring and torque actuated. The spring exerts a restoring force sufficient to take care of the unloaded condition of the driving gears and the torque supplies additional force necessary to return the gears to neutral under load.

During the use of the wringer if the operator's hand should become caught between the rolls, the operator would instinctively pull away from the rolls and this force would cause the wringer to pivot about the pivots 5 and 8. This pivotal movement is transmitted to bell crank levers 82 (Fig. 2) having arms 83 engaging the sides 11 of the channel shaped extension 10 and having arms 84 under the arm 58 of the bell crank lever carrying the latch 66 for holding the gears in the driving position. Upon pivotal movement of the wringer about the pivots 5 and 8 one or the other of the arms 83 is moved in the direction to raise the associated arm 84 and pivot the latch 66 away from the gear carrier 30. The raising of the arm 58 also lifts the latch member 60, moving the pin 63 clear of the latch plate 53 and permitting the return of the handle 49 to the neutral position under the action of the centering spring 54. Whenever the rolls are being driven, a thrust on the rolls will therefore release the latch holding the wringer gears in the driving position and cause an instantaneous stopping of the rolls. This provides a safety release sufficient to protect the operator from injury. It will be understood that the conventional wringer construction includes provisions for releasing the pressure between the rolls. This would provide an additional protection.

The tubular sleeve 78 depending from the lower side of the wringer head is pivotally supported on a wringer post 85 by a thrust collar 86 on the wringer post. At the lower end of the sleeve 78 is a circular flange 87 having on its under side integral conical projections 88 at opposite sides of the flange. The projections 88 are arranged on a diametral axis perpendicular to the axis of the wringer rolls. The conical projections fit in conical depressions 89 in the upper surface of the thrust collar 86 and yieldably locate the wringer in the desired angular position with respect to the wringer post. The force required to move the wringer from one of the indexed positions is determined by the weight of the wringer and by the slope of the conical projections and depressions. Since the weight of the wringer is overhung with respect to the center of the wringer post, there is some tendency for the sleeve 78 to cramp or bind on the wringer post. This is prevented by a counterbalance spring 90 around the index pin 75 which exerts a downward pressure on the upper surface of the flange 87 counterbalancing the overhung weight of the wringer. This effectively centers the weight of the wringer on the wringer post or at least close enough to the wringer post to prevent binding so that the wringer will freely slide up and down the wringer post as it is moved between indexed positions.

The reaction of the counterbalance spring is transmitted to the under side of the collar 86 by a U-shaped member 91 having its upper arm 92 slideable on the index pin 75 and cooperating with the upper end of the counterbalance spring 90 and its lower arm 93 hooked under the rim of the collar 86. The vertical sliding movement of the U-shaped member 91 is limited by a set screw 94 in the edge of the flange 87 and extending through a slot 95. The arm 93, as shown in Fig. 2, is of convex section so that the outer edges 96 extend somewhat below the lower surface of the collar 86. When the wringer is turned to a position in which the arm 93 is opposite a notch 97 in the collar 86, the wringer can be lifted off the wringer post. In this position the edges 96 are just slightly below the lower edge of the notch 97 so that when the wringer is replaced it can be turned in either direction without interference between the edges 96 and the edges of the notch 97.

When the wringer is in one of the index positions, the index pin 75 is directly above a hole 98 at the bottom of one of the depressions 89 so that when the handle 49 is turned to one of the driving positions, the index pin 75 is moved down through the hole to provide a positive stop preventing movement of the wringer from the index position. The diameter of the hole 98 is sufficiently greater than the diameter of the index pin so that there is normally no contact between the index pin and the sides of the hole. Apparently the torque reaction exerted on the wringer head through the driving force on the shaft 21 is insufficient under normal operation to overcome the yielding centering effect of the conical projections and depressions 88 and 89 which is sufficient to restore the wringer to the selected centered position in the absence of other forces on the wringer. Due to the overhung weight of the wringer, there is a tendency for the wringer to bind on the wringer post, particularly if the wringer is stationary. However, if there is even a slight rotation of the wringer on the wringer post, the wringer settles or winds down the post so the centering effect is not interfered with. The centering effect under all conditions is sufficient to hold the wringer in the selected index position against accidental jarring displacement but the centering effect is not so great as to prevent deliberate movement to another index position or to hold the wringer indexed under stall loads. Under normal operation it is therefore unnecessary that there be a positive indexing of the wringer. Under extreme conditions due to stalling overloads, the torque reaction may be sufficient to cam the projections 88 out of the depressions 89. This is prevented by the positive stop provided by the index pin 75 which has surfaces interengaging with one of the holes 98, the interengaging surface on the pin and holes being disengaged throughout on the torque side in the centered position of the wringer and the portions of the pin which support the section which interengages with the holes likewise being disengaged in the centered position so the pin serves as a delayed action positive stop.

Because of the instinctive release it is not necessary for the operator to return the wringer drive to neutral before changing the position of the wringer. All the operator needs to do is to push the wringer in the desired direction. The initial force acts through the bell crank levers 82 to trip the latches 69 and 66 holding the wringer drive in the driving position and the return of the handle 49 to the neutral position moves the index pin 75 out of the opening 98. This releases the positive index for the wringer which is now restrained only by the conical projections 88. While the conical projections 88 are between the depressions 89, the lower ends of the projections ride on the upper surface of the collar 86 and lift the lower end of the index pin 75 slightly above the surface of the collar. While in this position if the operator should try to move the handle 49 to a driving position, downward movement of the index pin would be resisted by the U-shaped member 91 which limits the lifting of the wringer which would necessarily have to take place if the index pin were forced downward against the top surface of collar 86 by the interlock cam 71. It is therefore impossible for the operator to move the wringer drive to a driving position except when the wringer is in one of its index positions.

In the modification shown in Figs. 9 and 10, most of the parts are the same as in the previously described construction and are indicated by the same reference numerals. The primary difference is in the wringer drive, the latch for holding the drive in the driving position, and the interlock between the drive and the index. The crown gear 15 which drives the wringer rolls continuously meshes with upper and lower pinions 99 and 100 journaled on the splined upper end 101 of a shaft 102 which at its lower end is provided with a coupling 103 for releasable engagement with the wringer drive shaft (not shown) which extends up through the wringer post. The shaft 102 is journaled in sleeve and thrust bearings 104 and 105 in the wringer head. The driving connection between the shaft 102 and one or the other of the pinions 99, 100 is made through a clutch member 106 splined on the shaft and having tapered clutch teeth 107 cooperating with tapered clutch teeth 108 on the pinions. The tapering of the clutch teeth is for the purpose of obtaining axial thrust on the clutch member proportional to the wringer driving torque and return it from either driving position to neutral. The reaction of this axial thrust on the pinions is taken by the bearings 104 and 105. The clutch member is shifted along the shaft 102 by a crank shaft 109 journaled in an end plate 110 for the wringer head and having a crank 111 fitting in an annular groove 112 in the periphery of the clutch member. The crank shaft 109 is manually turned by a handle 113 loosely held on the outer end of the crank shaft 109 by a set screw 114 in a hub 115 integral with the handle and which projects into an annular groove 116 in the shaft.

Fixed on the outer end of the hub 115 is a latch plate 117 having a pin 118 projecting through a slot 119 in a latch plate 120 keyed to the crank shaft 109. The pin 118 and slot 119 provide a lost motion connection between the handle 113 and the crank shaft 109. The latch plates 117 and 120 are yieldably centered in the neutral position by a pin 121 on a bell crank lever 122 pivoted at 123 on the end plate 110. The bell crank lever has a pin and slot connection 124 with a similar bell crank lever 125 pivoted at 126 on the opposite side of the end plate 110. The bell crank levers have arms 127 and 128 connected by a tension spring 129 holding the upper ends of the arms against the sides 11 of the channel shaped section 10 of the bottom frame of the wringer. The pin 121 rests in a shallow recess 130 in each of the latch plates 117 and 120.

Upon movement of the handle 113 in either direction from the neutral position, the initial movement first takes up the lost motion between the pin 118 and the slot 119 and thereafter the latch plates 117 and 120 move together. Upon reaching the driving position, the pin 121 on the bell crank lever 122 rides off the surfaces 131 on the latch plate 120 and drops behind a positive locking shoulder 132. This positively holds the clutch 106 in the driving position. The latch plates plates 117 and 120 are turned approximately 45 degrees from the neutral position shown in Fig. 10 and the pin 121 is behind one of the locking shoulders 132 on the latch plate 120 and is adjacent one of the cam surfaces 133 on the latch plate 117. Upon release of the handle, it returns toward the neutral position by gravity. In this position the pin 118 is midway between the ends of the slot 119 so that the handle 113 and the latch plate 117 fixed thereto can turn relatively to the latch plate 120. In the "on" or driving position of the gearing the pin 118 occupies the position illustrated in Fig. 10, that is, the pin 118 is at the center of the slot 119. The pin 118 would come back to one end of the slot 119 if the shoulder 131 did not prevent such movement. The initial movement of the handle 113 toward the neutral position forces one of the cam surfaces 131 against the pin 121 and cams the pin 121 from behind the locking shoulder 132, releasing the clutch 106 which returns to neutral. The camming movement of the pin 121 requires a stretching of the tension spring 129 which offers sufficient resistance to prevent unintentional release of the drive. Pivotal movement of the wringer about the pins 5 and 8 due to the instinctive reaction of the operator as described above forces the arms 127 and 128 of the bell crank levers 122 and 125 apart and lifts the pin 121 clear of the locking shoulder 132. This provides an instinctive release for the wringer drive.

The latch plates 117 and 120 have identical cam surfaces 134 on opposite sides of the crank shaft 109 which, in the neutral position, are horizontal and rest against a horizontal flange 135 at the upper end of a yoke 136 fixed to the index pin 75. In either driving position rounded projections 137 at the outer ends of the surfaces 134 force the index pin downward and move it through one of the holes 98 in the index collar to provide a positive index lock in the same manner as in the previously described construction. The downward movement of the index pin is resisted by the spring 79 which provides the centering force tending to return the crank shaft 109 to the neutral position. The centering force of the spring 79 is sufficient to return the crank shaft to the neutral position under no load conditions. Under load conditions there is an additional centering force obtained from the torque reaction between the tapered clutch teeth 107 and 108. The wringer has the same yielding index as in the previously described construction with the same arrangement for preventing downward movement of the index pin except when the wringer is in one of the index positions. This effectively prevents establishment of the wringer drive while the wringer is between the index positions.

It is important that the instinctive force required to release the driving mechanism be less than that required to pivot the wringer head sufficiently to bring the index pin into engagement with the sides of the opening 98. This eliminates the friction drag of releasing the index pin and thereby permits a more sensitive release of the wringer drive.

The sensitive release of the wringer drive requires compensation for the driving torque which is obtained by the tapered clutch surfaces. Fig. 11 is a perspective view of the clutch surface 38 which cooperates with the pin 28 to establish one of the driving connections in the wringer shown in Figs. 1 to 8 inclusive. This clutch surface has a flat surface 138, which serves as the driving surface in the fully engaged position. There is radial line contact (with respect to the axis of the shaft 21) between the surface 138 and the pin 28. Due to the fact that there is relative rotation between the clutch surface 38 and the pin 28 during the release, satisfactory operation cannot be obtained if the radial driving surface 138 extends the full radial length of the clutch tooth 38. For best operation the surface in contact with the pin 28 should be generated so as to provide a uniform axial thrust angle with the pin in each position of the clutch tooth. A satisfactory compromise is obtained by the construction shown in Figs. 11, 11a and 11b in which the corners of the clutch tooth 38 are milled to provide a conical surface 139. This surface cooperates with the pin 28 during the release movement providing a substantially constant thrust along the axis of the gears and preventing any gouging of the surface due to localized contact.

Figs. 12 and 13 show the generated surface similar to a long pitch screw thread adapted to the clutch teeth 107 and 108 of the wringer drive shown in Fig. 9. In other words, the clutch surfaces are helical along the axis of the shaft 102. In the fully engaged position the driving contact is at the base of the teeth along the radial line 140. As the teeth move axially and at the same time rotate, the contact progress along radial lines toward the tips until the teeth are completely separated. The generated clutch surfaces as shown in Fig. 12 prevent localized wear in the clutch surfaces which would otherwise substantially eliminate the axial separating force due to the wringer driving torque.

The modification shown in Figs. 14, 15 and 16 is similar to the modification shown in Figs. 9 and 10, corresponding parts being indicated by the same reference numerals. In this modification a pressure release is shown actuated by the instinctive thrust on the wringer and interlocked with the index so as to prevent instinctive operation while the wringer is being shifted from one index position to another. The modification may retain as an additional safety device the instinctive control for stopping the roll drive and a manual pressure release.

At the outer end of the wringer is a side stile 3a connected to the top frame 2 by an unstable toggle comprising links 141 pivoted at 142 on the side stile and at 143 on the sides of a channel shaped link 144 which, in the pressure position, encloses the links 141. The toggle link 144 is pivoted at 145 on the top frame, the pivot being so located that in the pressure position the toggle is unstable. The toggle is held in the pressure position by a U-shaped lever 146 having sides 147 straddling the side stile 3a and pivoted thereon at 148. Each of the sides 147 has a notch 149 engaging the pins 143 and holding the toggle in the pressure sustaining position. In this position upper and lower rolls 150 and 151 are pressed together by a pressure spring 152 to a pressure determined by the adjustment of a pressure screw 153. The lever 146 is pivoted about the pivots 148 to release the toggle by links 154 extending along the top of the wringer within the sides of the top frame 2. At the wringer head end, the links 154 extend through slots 155 in the side stile 3 and have slotted ends 156 connected to the wringer head by pins 157. In the normal position of the wringer, each of the pins 157 rests against the extreme right hand end of the slot 156.

In case the operator's hand is caught between the rolls, the instinctive reaction of the operator causes the wringer to pivot about the pivots 5 and 8. No matter which direction the wringer pivots, one of the links 154 will be moved toward the side stile 3a and since both of the links are connected to the lever 146 by pins 158, both of the links 154 will move together. This causes the lever 146 to pivot in a clockwise direction as viewed in Fig. 14, causing the notch 149 to pivot relative to the toggle pins 143 and unlatch the toggle. Since the toggle is unstable, upon unlatching the links move in the direction to release the roll pressure.

While the wringer is being shifted from one index position to another it is undesirable that the roll pressure be released since it would serve no useful purpose and would require resetting of the pressure by the operator. Even though this can be conveniently done by pressing on the long toggle link 144, it is nevertheless desirable to avoid this unnnecessary resetting. This is avoided by an interlock between the pressure release and a safety index pin 159 having the same function as the index pin 75 in the wringer shown in Fig. 10. The index pin 159 is made in two parts, an upper part 160 slidable through the ear 76 on the wringer, and a lower part 161 slidable in the ear 77 and cooperating with the openings 98 to provide a safety stop positively locating the wringer in the indexed position. The upper and lower parts of the index pin are connected by a removable sleeve 162. The sleeve 162 may be fixed in place as shown in Fig. 14 or it may be omitted and under either condition the wringer may be used with the operating characteristics hereinafter described. The upper end of the part 160 is connected to the yoke 136 providing an interlock between the index pin and the wringer drive similar to that shown in Figs. 9 and 10. A spring 163 arranged between the ear 76 and the yoke 136 biases the index pin upwardly and provides a restoring force urging the wringer drive to neutral. The lower part 161 of the index pin carries a slide 164 having a guide slot 165 and having a tapered upper end 166 which, in the uppermost position shown in Fig. 16, fits between the sides 11 of the channel shaped extension on the lower wringer frame and locks the wringer against pivotal movement about the pivots 5 and 8. This prevents the pivotal movement of the wringer under the instinctive reaction of the operator which is used to actuate the pressure release.

When the upper and lower parts of the index pin 159 are connected by the sleeve 162, actuation of the control handle 113 in the direction to move the wringer drive to neutral retracts the index pin and by means of the slide 164 locks the pressure release. The operator is then free to push the wringer to another index position without causing the pivotal movement of the wringer which would actuate the pressure release. Upon reaching the selected index position the wringer is yieldably centered in this position by the cam faced projections 88 which fit in the corresponding depressions 89. The yieldable centering of the wringer absorbs the wringer momentum so that upon subsequent movement of the control handle 113 to start the wringer drive, the wringer does not have sufficient momentum to cause actuation of the pressure release. This is important because in previous arrangements in which the pressure release was locked out by unlocking of the index, the wringer frame sometimes had enough momentum to actuate the pressure release after the index pin was dropped into the locking position.

When the sleeve 162 is removed, the upper part 160 of the index pin provides the centering force tending to return the wringer drive to neutral and the lower part 161 of the index pin extends through one of the holes 98 and provides a safety stop limiting movement of the wringer from the indexed position. When the wringer is to be shifted, the slide 164 is manually lifted until its upper end projects between the sides of the channel 10 and locks the pressure release against actuation and the wringer is then pushed to the new index position. Upon reaching the new index position, the cam faced projections 88 drop into the depressions 89 and yieldably center the wringer in the new index position. The centering absorbs the wringer momentum so when the slide 164 drops by gravity and unlocks the pressure release, there is not enough momentum in the wringer to cause sufficient pivoting about the pivots 5 and 8 to actuate the pressure release. The combination of a yielding index with a lost motion positive index prevents unwanted pressure release due to pivoting of the wringer under its momentum during the interval between the time the slide 164 moves clear of the channel 10 and the lower end 161 of the index pin drops into one of the holes 98 in the index collar 86. It will be noted that the slide 164 drops freely after the wringer has been yieldably positioned by the projections and depressions 88, 89 because at this time there is no strain on the slide 164 and the wringer is positioned so the lower end 161 of the index pin is centered above a larger diameter opening 98 in the index collar 86.

What I claim as new is:

1. In a swinging wringer, index means yieldably centering and holding the wringer in any one of a plurality of angular positions, said index means exerting a restraining force insufficient to prevent deliberate repositioning of the wringer by a push on the wringer, and a safety lock separate from and independent of the index means and movable to locking and unlocking positions, and in the locking position having interfitting parts with lost motion in the centered position of the wringer taken up by movement of the wringer under greater than normal wringing torque to positively limit movement from the selected position, the lost motion being such that the yieldable index means exerts a restraining force up to the time the lost motion is taken up.

2. In a swinging wringer, index means yieldably centering the wringer in any one of a plurality of angular positions, said index means exerting a restraining force insufficient to restrain the wringer under torque reaction due to stalling overloads, safety lock means, a drive for the wringer having a control for setting the safety lock means with the setting of the drive, said safety lock means in the set position having a positive stop comprising inter-engaging parts with lost motion therebetween and being disengaged in the centered position of the wringer throughout all of the interengaging surfaces on the torque side, a support for one of the parts, said support being disengaged in the centered position of the wringer from said other part whereby it is effective to limit movement of the wringer under stall loads, the lost motion being such that the yieldable index means exerts a restraining force up to the time the lost motion is taken up, a safety release for the wringer, and an interlock between the safety release and the safety lock unlocking the safety lock upon operation of the release.

3. In a swinging wringer, index means yieldably holding the wringer in any one of a plurality of angular positions, said index means exerting a restraining force sufficient to restrain the wringer under the torque reaction due to normal wringing but insufficient to restrain the wringer under the torque reaction due to stalling overloads, safety lock means, a drive for the wringer biased to the off position, latch means holding the drive in the on position, a control for setting the safety lock means with the setting of the drive in the on position, said safety lock means in the set position having a positive stop with lost motion whereby it is effective to limit movement of the wringer under stall loads but ineffective to limit movement of the wringer under normal wringing, the lost motion being such that the yieldable index means exerts a restraining force up to the time the lost motion is taken up, a safety release, and an interlock between the safety release, the latch means and the safety lock unlocking the safety lock and latch means upon operation of the release.

4. In a swinging wringer having at one end a head mountable for swinging and sliding movement on a wringer post, means counterbalancing the overhung weight of the wringer, cam means yieldably centering the wringer in an index position, said means having interengaging cam surfaces lifting the wringer on the post upon swinging of the wringer from the index position, and a positive locking device having in the locked position surfaces with lost motion therebetween which are out of engagement in the centered position of the wringer which engage upon movement of the wringer from the centered position and positively limit movement of the wringer from the index position.

5. In a swinging wringer having at one end a head mountable for swinging and sliding movement on a wringer post, means counterbalancing the overhung weight of the wringer, cam means yieldably centering the wringer in an index position, said means having interengaging cam surfaces lifting the wringer on the post upon swinging of the wringer from the index position, a positive locking device having in the locked position surfaces with lost motion therebetween which are out of engagement in the centered position of the wringer and which engage upon movement of the wringer from the centered position and positively limit movement of the wringer from the index position, and a wringer drive having an interlock preventing movement of the locking device from the locked position when the wringer is driven.

6. In a swinging wringer having at one end a head mountable for swinging and sliding movement on a wringer post, means counterbalancing the overhung weight of the wringer, interfitting cam faced detents on the wringer head and post for yieldably centering the wringer in any one of a plurality of index positions, at least one of the detents being inclined relative to the axis of the wringer post so as to lift the wringer on the post upon swinging of the wringer from the centered position, and a positive locking device having in the locked position surfaces with lost motion therebetween which are out of engagement in the centered position of the wringer and which engage upon movement of the wringer from the centered position and positively limit movement of the wringer from the index position.

7. In a swinging wringer, a wringing pressure release responsive to a thrust on the wringer, means yieldably indexing the wringer in any one of a plurality of angular positions, said index means exerting a restraining force insufficient to prevent deliberate repositioning of the wringer by a push on the wringer, a positive stop limiting angular movement of the wringer from the selected indexed position, said stop having lost motion in a direction circumferential of the indexing axis taken up by angular movement of the wringer from the selected indexed position, the lost motion being such that the yieldable index means exerts a restraining force up to the time the lost motion is taken up, and means for manually disabling the stop to permit shifting of the wringer to a new index position and for disabling the pressure release so as to prevent unwanted pressure release while the wringer is being shifted.

8. In a swinging wringer, a wringer post having an index collar, a wringer having at one end a head journaled for swinging movement on the post, interfitting cam faced surfaces on the head and collar yieldably locating the wringer in an index position, at least one end of said surfaces being inclined relative to the axis of the wringer post so as to lift the wringer on the post as it is swung from the index position, a spring exerting a downward force on the side of the head opposite the overhung weight of the wringer, and a hook transmitting the reaction of the spring to the under side of the index collar.

9. In a swinging wringer, a wringer post having an index collar, a wringer having at one end a head journaled for swinging movement on the post, interfitting cam faced surfaces on the head and collar yieldably locating the wringer in any one of a plurality of index positions, the index collar having holes, an index pin on the head aligned in the index positions with said holes, the holes being of substantially larger diameter than the index pin, a drive for the wringer biased to neutral, a latch holding the drive in driving position, interlock means between the drive and index pin moving the pin into and out of one of said holes respectively in the driving and neutral positions, and means responsive to a thrust on the wringer for tripping the latch.

10. In a swinging wringer, a wringer post having an index collar, a wringer having at one end a head journaled for swinging movement on the post, interfitting cam faced surfaces on the head collar yieldably centering the wringer in any one of a plurality of indexed positions, the index collar having holes, an index pin on the head aligned in the centered positions with said holes, the holes being of substantially larger diameter than the index pin, a drive for the wringer movable to neutral and driving positions, and interlock means between the drive and index pin moving the pin into and out of one of said holes respectively in the driving and neutral posistions, the interlock having lost motion permitting the index pin to remain in said one hole upon movement of the drive out of the driving position, and the pin in the centered position being disengaged from said one hole on the torque side.

11. In a wringer, a drive having clutch members with engaging surfaces tending to cam the members apart in proportion to the driving torque, a latch holding the clutch members in the engaged position, index means yieldably holding the wringer in any one of a plurality of index positions, a positive lock having in the locking position normally disengaged surfaces limiting movement of the wringer from the index position, spring means moving the lock to the unlocked position, and an operating connection between the lock and one of the clutch members moving the lock to the locking position as the clutch member is moved to the engaged position and unblocking the lock as the clutch member is moved to the disengaged position.

12. In a swinging wringer, a wringer post having an index collar, a wringer having at one end a head journaled for swinging movement on the post, interfitting cam faced means on the head and collar yieldably locating the wringer in any one of a plurality of index positions, a hook movably connected to the head having its lower end beneath the collar, the collar having a notch through which the hook passes when the wringer is lifted off the wringer post, and a spring acting between the hook and the head and exerting a force on the head counterbalancing the overhung weight of the wringer.

13. In a swinging wringer, a wringer post having an index collar, a wringer having at one end a head journaled for swinging movement on the post, interfitting cam faced means on the head and collar yieldably locating the wringer in any one of a plurality of index positions, a spring connection between the head and collar counterbalancing the overhung weight of the wringer, safety lock means normally inactive and brought into action in response to greater than normal wringing torque to positively limit movement from the selected position, a safety release rendering the safety lock inactive upon operation of the release, and means responsive to a thrust on the wringer actuating the safety release.

14. In a swinging wringer, a wringer post having an index collar, a wringer having at one end a head journaled for swinging movement on the post, interfitting cam faced means on the head and collar yieldably locating the wringer in any one of a plurality of index positions, a spring exerting a downward force on the side of the head opposite the overhung weight, a hook transmitting the reaction of the spring to the under side of the index collar, safety lock means normally inactive and brought into action in response to greater than normal wringing torque to positively limit movement from the selected position, a safety release rendering the safety lock inactive upon operation of the release, and means responsive to a thrust on the wringer actuating the safety release.

15. In a swinging wringer, a wringer post having an index collar, a wringer having at one end a head journaled for swinging movement on the post, interfitting cam faced means on the head and collar yieldably locating the wringer in any one of a plurality of index positions, a hook movably connected to the head having its lower end beneath the collar, the collar having a notch through which the hook passes when the wringer is lifted off the wringer post, a spring acting between the hook and the head and exerting a force on the head counterbalancing the overhung weight of the wringer, safety lock means normally inactive and brought into action in response to greater than normal wringing torque to positively limit movement from the selected position, a safety release rendering the safety lock inactive upon operation of the release, and means responsive to a thrust on the wringer actuating the safety release.

16. In a swinging wringer, index means yieldably centering the wringer in any one of a plurality of index positions, said centering means having cam surfaces interengaging in the selected index position and for a limited range of movement of the wringer from said position and yieldably resisting movement therefrom with sufficient force to restrain the wringer under the torque reaction during normal wringing, but insufficient to restrain the wringer under the torque reaction due to stalling overloads, safety lock means for positively restraining movement of the wringer, said safety lock means having in the locking position surfaces disengaged from each other in the selected centered position of the wringer, which engage each other upon movement of the wringer from the selected centered position a distance not greater than the limited range during which the cam surfaces engage, a drive for the wringer, and a control for the drive locking and unlocking the safety lock means with the setting and release of the drive.

17. In a swinging wringer, a head, a wringer frame articulated on the head, index means yieldably holding the head in any one of a plurality of angular positions, said index means exerting a restraining force sufficient to restrain the head under the torque reaction due to normal wringing but insufficient to restrain the head under the torque reaction due to stalling overloads, safety lock means, a wringer drive in the head, a control for the drive setting the safety lock means with the setting of the drive, said safety lock means in the set position having a positive stop effective to limit movement of the head under normal wringing, a safety release responsive to articulation of the wringer frame with respect to the head, and an interlock between the safety release and the safety lock unlocking the safety lock upon operation of the release.

18. In a swinging wringer, index means yieldably centering the wringer in any one of a plurality of index positions, said centering means having cam surfaces interengaging in the selected index position and for a limited range of movement of the wringer from said position and yieldably resisting movement therefrom with sufficient force to restrain the wringer under the torque reaction during normal wringing and to restore the wringer to the centered position in the selected absence of other forces on the wringer, but insufficient to restrain the wringer under the torque reaction due to stalling overloads, safety lock means for positively restraining movement of the wringer, said safety lock means having in the locking position surfaces disengaged from each other in the selected centered position of the wringer, which engage each other upon movement of the wringer from the selected centered position a distance not greater than the limited range during which the cam surfaces engage, a drive for the wringer, a control for setting the drive in on and off positions, and an interlock between the control and the safety lock forcing the safety lock to the locking position upon setting of the drive to the on position and permitting unlocking of the safety lock in the off position, and spring means urging the safety lock to the off position.

19. In a swinging wringer, a drive having clutch members, index means yieldably centering and holding the wringer in any selected one of a plurality of angular positions with a force insufficient to prevent deliberate repositioning by pushing the wringer against the holding force of the yieldable index means, a positive index lock having in the locking position surfaces disengaged throughout and offering no restraint in the centered position of the wringer and interengageable upon, and positively limiting, movement of the wringer from the selected index position, spring means biasing the lock to the unlocked position, a control for the drive clutch members, and an operative connection between the control and the lock moving the lock to the locking position as the clutch members are engaged and unblocking movement of the lock to the unlocked position as the clutch members are disengaged.

20. In a wringer, a drive having clutch members, index means yieldably holding the wringer in any one of a plurality of index positions with a force insufficient to prevent deliberate repositioning by pushing the wringer against the holding force of the yieldable index means, a positive lock having in the locking position normally disengaged surfaces limiting movement of the wringer from the index position, spring means urging the lock to the unlocked position, a clutch shift control, an interlock compelling movement of the lock to the locking position upon movement of the shift control to a driving position, and a lost motion connection in the interlock permitting movement of the clutch control to an off position.

WALTER L. KAUFFMAN, II.

REFERENCES CITED

The following references are of record in the file of this patent:

UNITED STATES PATENTS

| Number | Name | Date |
|---|---|---|
| 1,450,736 | Smith | Apr. 3, 1923 |
| 1,582,234 | Altorfer | Apr. 27, 1926 |
| 1,665,263 | Hirschy | Apr. 10, 1928 |
| 1,684,265 | Criner | Sept. 11, 1928 |
| 1,853,919 | More | Apr. 12, 1932 |
| 2,024,947 | Racklyeft | Dec. 17, 1935 |
| 2,148,481 | LeFrank | Feb. 28, 1939 |
| 2,155,525 | Bendheim | Apr. 25, 1939 |
| 2,216,398 | Kauffman | Oct. 1, 1940 |
| 2,297,997 | Behan | Oct. 6, 1942 |
| 2,314,708 | Kauffman | Mar. 23, 1943 |
| 2,320,324 | Kauffman | May 25, 1943 |
| 2,320,325 | Kauffman | May 25, 1943 |
| 2,332,129 | Blough | Oct. 19, 1943 |
| 2,346,738 | Etten | Apr. 18, 1944 |
| 2,369,333 | Bottinelli | Feb. 13, 1945 |
| 2,388,207 | Etten | Oct. 30, 1945 |
| 2,407,922 | Ferris | Sept. 17, 1946 |
| 2,435,536 | Ferris | Feb. 3, 1948 |